(12) United States Patent
Rothman

(10) Patent No.: US 6,396,187 B1
(45) Date of Patent: May 28, 2002

(54) LAMINATED MAGNETIC CORE FOR ELECTRIC MACHINES

(75) Inventor: Bengt Rothman, Vasteras (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/297,605

(22) PCT Filed: Nov. 4, 1997

(86) PCT No.: PCT/SE97/01842
§ 371 (c)(1),
(2), (4) Date: Jun. 18, 1999

(87) PCT Pub. No.: WO98/20596
PCT Pub. Date: May 14, 1998

(30) Foreign Application Priority Data

Nov. 4, 1996 (SE) .............................. 9604028

(51) Int. Cl.[7] .............................. H02K 1/00
(52) U.S. Cl. .................. 310/216; 310/254; 310/258; 310/259; 310/215; 310/217; 310/218
(58) Field of Search .................. 310/254, 289; 29/596, 598; 174/13–33

(56) References Cited

U.S. PATENT DOCUMENTS

| 681,800 | A | 9/1901 | Lasche |
| 847,008 | A | 3/1907 | Kitsee |
| 1,304,451 | A | 5/1919 | Burnham |
| 1,418,856 | A | 6/1922 | Williamson |

(List continued on next page.)

FOREIGN PATENT DOCUMENTS

| AT | 399790 | 7/1995 |
| BE | 565063 | 2/1957 |
| CH | 391071 | 4/1965 |
| CH | 266037 | 10/1965 |

(List continued on next page.)

OTHER PUBLICATIONS

A test installation of a self–tuned ac filter in the Konti–Skan 2 HVDC link; T. Holmgren, G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp. 64–70.

(List continued on next page.)

Primary Examiner—Elvin Enad
(74) Attorney, Agent, or Firm—Dykema Gossett PLLC

(57) ABSTRACT

The present invention relates to a laminated magnetic core for rotating electric machines. The laminated magnetic core comprises a number of stack members (40), each consisting of a number of sheets of metal joined together. Each stack member (40) is provided with two identical grooves (42) arranged to cooperate with wedge members (46) designed to join the stack members (40). The cross-sectional area of the groove (42) is larger than the cross-sectional area of the wedge member (46) and the wedge member (46) has two protrusions arranged symmetrically in relation to the longitudinal axis of the wedge member. The groove (42) has at least one part shaped to fit said protrusion. The stack members (40) in the laminated magnetic core are stacked on and partially overlapping each other to form different layers of stack members (40). The grooves (42) in the stack members (40) in the various layers are arranged substantially opposite each other with the wedge members (46) arranged in the grooves (42) and a protrusion abutting the complementary shape of the groove (42) in such a manner that the stack members (40) in one layer are secured counter-clockwise in tangential direction and that the stack members in at least one of the adjacent layers are secured clockwise in tangential direction. The laminated magnetic core also includes locking members arranged at least at the transition between layers secured clockwise and layers secured counter-clockwise in order to prevent tangential movement between the different layers.

12 Claims, 3 Drawing Sheets

U.S. PATENT DOCUMENTS

| | | |
|---|---|---|
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr ......................... 310/254 |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Wiliamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,708,707 A * | 1/1973 | Kranz ..................... 310/258 |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,410 A | 12/1977 | Peterson |
| 4,080,724 A * | 3/1978 | Gillette ..................... 29/598 |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |

| 4,229,721 A | 10/1980 | Koloczek et al. | 4,571,453 A | 2/1986 | Tanaoka et al. |
| --- | --- | --- | --- | --- | --- |
| 4,238,339 A | 12/1980 | Khutoretsky et al. | 4,588,916 A | 5/1986 | Lis |
| 4,239,999 A | 12/1980 | Vinokurov et al. | 4,590,416 A | 5/1986 | Porche et al. |
| 4,245,182 A | 1/1981 | Aotsu et al. | 4,594,630 A | 6/1986 | Rabinowitz et al. |
| 4,246,694 A | 1/1981 | Raschbichler et al. | 4,607,183 A | 8/1986 | Rieber et al. |
| 4,255,684 A | 3/1981 | Mischler et al. | 4,615,109 A | 10/1986 | Wcislo et al. |
| 4,258,280 A | 3/1981 | Starcevic | 4,615,778 A | 10/1986 | Elton |
| 4,262,209 A | 4/1981 | Berner | 4,618,795 A | 10/1986 | Cooper et al. |
| 4,274,027 A | 6/1981 | Higuchi et al. | 4,619,040 A | 10/1986 | Wang et al. |
| 4,281,264 A | 7/1981 | Keim et al. | 4,622,116 A | 11/1986 | Elton et al. |
| 4,292,558 A | 9/1981 | Flick et al. | 4,633,109 A | 12/1986 | Feigel |
| 4,307,311 A | 12/1981 | Grozinger | 4,650,924 A | 3/1987 | Kauffman et al. |
| 4,308,476 A | 12/1981 | Schuler | 4,652,963 A | 3/1987 | Fahlen |
| 4,308,575 A | 12/1981 | Mase | 4,656,316 A | 4/1987 | Meitson |
| 4,310,966 A | 1/1982 | Brietenbach | 4,656,379 A | 4/1987 | McCarty |
| 4,314,168 A | 2/1982 | Breitenbach | 4,677,328 A | 6/1987 | Kumakura |
| 4,317,001 A | 2/1982 | Silver et al. | 4,687,882 A | 8/1987 | Stone et al. |
| 4,320,645 A | 3/1982 | Stanley | 4,692,731 A | 9/1987 | Osinga |
| 4,321,426 A | 3/1982 | Schaeffer | 4,723,083 A | 2/1988 | Elton |
| 4,321,518 A | 3/1982 | Akamatsu | 4,723,104 A | 2/1988 | Rohatyn |
| 4,330,726 A | 5/1982 | Albright et al. | 4,724,345 A | 2/1988 | Elton et al. |
| 4,337,922 A | 7/1982 | Streiff et al. | 4,732,412 A | 3/1988 | van der Linden et al. |
| 4,341,989 A | 7/1982 | Sandberg et al. | 4,737,704 A | 4/1988 | Kalinnikov et al. |
| 4,347,449 A | 8/1982 | Beau | 4,745,314 A | 5/1988 | Nakano |
| 4,347,454 A | 8/1982 | Gellert et al. | 4,761,602 A | 8/1988 | Leibovich |
| 4,353,612 A | 10/1982 | Meyers | 4,766,365 A | 8/1988 | Bolduc et al. |
| 4,357,542 A | 11/1982 | Kirschbaum | 4,771,168 A | 9/1988 | Gundersen et al. |
| 4,360,748 A | 11/1982 | Raschbichler et al. | 4,785,138 A | 11/1988 | Brietenbach et al. |
| 4,361,723 A | 11/1982 | Hvizd, Jr. et al. | 4,795,933 A | 1/1989 | Sakai |
| 4,365,178 A | 12/1982 | Lexz | 4,827,172 A | 5/1989 | Kobayashi |
| 4,367,425 A | 1/1983 | Mendelsohn et al. | 4,845,308 A | 7/1989 | Womack, Jr. et al. |
| 4,367,890 A | 1/1983 | Spirk | 4,847,747 A | 7/1989 | Abbondanti |
| 4,368,418 A | 1/1983 | Demello et al. | 4,853,565 A | 8/1989 | Elton et al. |
| 4,369,389 A | 1/1983 | Lambrecht | 4,859,810 A | 8/1989 | Cloetens et al. |
| 4,371,745 A | 2/1983 | Sakashita | 4,859,989 A | 8/1989 | McPherson |
| 4,384,944 A | 5/1983 | Silver et al. | 4,860,430 A | 8/1989 | Raschbichler et al. |
| 4,387,316 A | 6/1983 | Katsekas | 4,864,266 A | 9/1989 | Feather et al. |
| 4,401,920 A | 8/1983 | Taylor et al. | 4,883,230 A | 11/1989 | Lindstrom |
| 4,403,163 A | 9/1983 | Rarmerding et al. | 4,890,040 A | 12/1989 | Gundersen |
| 4,404,486 A | 9/1983 | Keim et al. | 4,894,284 A | 1/1990 | Yamanouchi et al. |
| 4,411,710 A | 10/1983 | Mochizuki et al. | 4,914,386 A | 4/1990 | Zocholl |
| 4,421,284 A | 12/1983 | Pan | 4,918,347 A | 4/1990 | Takaba |
| 4,425,521 A | 1/1984 | Rosenberry, Jr. et al. | 4,918,835 A | 4/1990 | Wcislo et al. |
| 4,426,771 A | 1/1984 | Wang et al. | 4,924,342 A | 5/1990 | Lee |
| 4,429,244 A | 1/1984 | Nikiten et al. | 4,926,079 A | 5/1990 | Niemela et al. |
| 4,431,960 A | 2/1984 | Zucker | 4,942,326 A | 7/1990 | Butler, III et al. |
| 4,432,029 A | 2/1984 | Lundqvist | 4,949,001 A | 8/1990 | Campbell |
| 4,437,464 A | 3/1984 | Crow | 4,982,147 A | 1/1991 | Lauw |
| 4,443,725 A | 4/1984 | Derderian et al. | 4,994,952 A | 2/1991 | Silva et al. |
| 4,470,884 A | 9/1984 | Carr | 4,997,995 A | 3/1991 | Simmons et al. |
| 4,473,765 A | 9/1984 | Butman, Jr. et al. | 5,012,125 A | 4/1991 | Conway |
| 4,475,075 A | 10/1984 | Munn | 5,030,813 A | 7/1991 | Stanisz |
| 4,477,690 A | 10/1984 | Nikitin et al. | 5,036,165 A | 7/1991 | Elton et al. |
| 4,481,435 A * | 11/1984 | Loforese .................. 310/71 | 5,036,238 A | 7/1991 | Tajima |
| 4,481,438 A | 11/1984 | Keim | 5,066,881 A | 11/1991 | Elton et al. |
| 4,484,106 A | 11/1984 | Taylor et al. | 5,067,046 A | 11/1991 | Elton et al. |
| 4,485,320 A * | 11/1984 | Kawada et al. ............ 310/217 | 5,083,360 A | 1/1992 | Valencic et al. |
| 4,488,079 A | 12/1984 | Dailey et al. | 5,086,246 A | 2/1992 | Dymond et al. |
| 4,490,651 A | 12/1984 | Taylor et al. | 5,091,609 A | 2/1992 | Swada et al. |
| 4,503,284 A | 3/1985 | Minnick et al. | 5,094,703 A | 3/1992 | Takaoka et al. |
| 4,508,251 A | 4/1985 | Harada et al. | 5,095,175 A | 3/1992 | Yoshida et al. |
| 4,510,077 A | 4/1985 | Elton | 5,097,241 A | 3/1992 | Smith et al. |
| 4,517,471 A | 5/1985 | Sachs | 5,097,591 A | 3/1992 | Wcislo et al. |
| 4,520,287 A | 5/1985 | Wang et al. | 5,111,095 A | 5/1992 | Hendershot |
| 4,523,249 A | 6/1985 | Arimoto | 5,124,607 A | 6/1992 | Rieber et al. |
| 4,538,131 A | 8/1985 | Baier et al. | 5,136,459 A | 8/1992 | Fararooy |
| 4,546,210 A | 10/1985 | Akiba et al. | 5,140,290 A | 8/1992 | Dersch |
| 4,551,780 A | 11/1985 | Canay | 5,153,460 A | 10/1992 | Bovino et al. |
| 4,557,038 A | 12/1985 | Wcislo et al. | 5,168,662 A | 12/1992 | Nakamura et al. |
| 4,560,896 A | 12/1985 | Vogt et al. | 5,171,941 A | 12/1992 | Shimizu et al. |
| 4,565,929 A | 1/1986 | Baskin et al. | 5,182,537 A | 1/1993 | Thuis |

| | | | | | | |
|---|---|---|---|---|---|---|
| 5,187,428 A | 2/1993 | Hutchison et al. | | DE | 501181 | 7/1930 |
| 5,231,249 A | 7/1993 | Kimura et al. | | DE | 508181 | 9/1930 |
| 5,235,488 A | 8/1993 | Koch | | DE | 523047 | 4/1931 |
| 5,246,783 A | 9/1993 | Spenadel et al. | | DE | 568508 | 1/1933 |
| 5,264,778 A | 11/1993 | Kimmel et al. | | DE | 572030 | 3/1933 |
| 5,287,262 A | 2/1994 | Klein | | DE | 584639 | 9/1933 |
| 5,304,883 A | 4/1994 | Denk | | DE | 586121 | 10/1933 |
| 5,305,961 A | 4/1994 | Errard et al. | | DE | 604972 | 11/1934 |
| 5,321,308 A | 6/1994 | Johncock | | DE | 629301 | 4/1936 |
| 5,323,330 A | 6/1994 | Asplund et al. | | DE | 673545 | 3/1939 |
| 5,325,008 A | 6/1994 | Grant | | DE | 719009 | 3/1942 |
| 5,325,259 A | 6/1994 | Paulsson | | DE | 846583 | 8/1952 |
| 5,327,637 A | 7/1994 | Britenbach et al. | | DE | 875227 | 4/1953 |
| 5,341,281 A | 8/1994 | Skibinski | | DE | 975999 | 1/1963 |
| 5,343,139 A | 8/1994 | Gyugyi et al. | | DE | 1465719 | 5/1969 |
| 5,355,046 A | 10/1994 | Weigelt | | DE | 1807391 | 5/1970 |
| 5,365,132 A | 11/1994 | Hann et al. | | DE | 2050674 | 5/1971 |
| 5,387,890 A | 2/1995 | Estop et al. | | DE | 1638176 | 6/1971 |
| 5,397,513 A | 3/1995 | Steketee, Jr. | | DE | 2155371 | 5/1973 |
| 5,399,941 A | 3/1995 | Grothaus et al. | | DE | 2400698 | 7/1975 |
| 5,400,005 A | 3/1995 | Bobry | | DE | 2520511 | 11/1976 |
| 5,408,169 A | 4/1995 | Jeanneret | | DE | 2656389 | 6/1978 |
| 5,449,861 A | 9/1995 | Fujino et al. | | DE | 2721905 | 11/1978 |
| 5,452,170 A | 9/1995 | Ohde et al. | | DE | 2824951 | 12/1979 |
| 5,468,916 A | 11/1995 | Litenas et al. | | DE | 2835386 | 2/1980 |
| 5,499,178 A | 3/1996 | Mohan | | DE | 2839517 | 3/1980 |
| 5,500,632 A | 3/1996 | Halser, III | | DE | 2854520 | 6/1980 |
| 5,510,942 A | 4/1996 | Bock et al. | | DE | 3009102 | 9/1980 |
| 5,530,307 A | 6/1996 | Horst | | DE | 2920478 | 12/1980 |
| 5,533,658 A | 7/1996 | Benedict et al. | | DE | 3028777 | 3/1981 |
| 5,534,754 A | 7/1996 | Poumey | | DE | 2939004 | 4/1981 |
| 5,545,853 A | 8/1996 | Hildreth | | DE | 3006382 | 8/1981 |
| 5,550,410 A | 8/1996 | Titus | | DE | 3008818 | 9/1981 |
| 5,554,902 A * | 9/1996 | Kessens et al. ............. 310/254 | | DE | 209313 | 4/1984 |
| 5,583,387 A | 12/1996 | Takeuchi et al. | | DE | 3305225 | 8/1984 |
| 5,587,126 A | 12/1996 | Steketee, Jr. | | DE | 3309051 | 9/1984 |
| 5,598,137 A | 1/1997 | Alber et al. | | DE | 3441311 | 5/1986 |
| 5,607,320 A | 3/1997 | Wright | | DE | 3543106 | 6/1987 |
| 5,612,510 A | 3/1997 | Hildreth | | DE | 2917717 | 8/1987 |
| 5,663,605 A | 9/1997 | Evans et al. | | DE | 3612112 | 10/1987 |
| 5,672,926 A | 9/1997 | Brandes et al. | | DE | 3726346 | 2/1989 |
| 5,689,223 A | 11/1997 | Demarmels et al. | | DE | 2913697 | 10/1990 |
| 5,807,447 A | 9/1998 | Forrest | | DE | 3925337 | 2/1991 |
| 5,834,699 A | 11/1998 | Buck et al. | | DE | 4023903 | 11/1991 |

FOREIGN PATENT DOCUMENTS

| | | | | | |
|---|---|---|---|---|---|
| | | | DE | 4022476 | 1/1992 |
| | | | DE | 4233558 | 3/1994 |
| CH | 534448 | 2/1973 | DE | 4402184 | 8/1995 |
| CH | 539328 | 7/1973 | DE | 4409794 | 8/1995 |
| CH | 646403 | 2/1979 | DE | 4412761 | 10/1995 |
| CH | 657482 | 8/1986 | DE | 4420322 | 12/1995 |
| CH | 1189322 | 10/1986 | DE | 19620906 | 1/1996 |
| DD | 137164 | 8/1979 | DE | 4438186 | 5/1996 |
| DD | 138840 | 11/1979 | DE | 19020222 | 3/1997 |
| DE | 40414 | 8/1887 | DE | 19547229 | 6/1997 |
| DE | 134022 | 12/1901 | DE | 468827 | 7/1997 |
| DE | 277012 | 7/1914 | EP | 049104 | 4/1982 |
| DE | 336418 | 6/1920 | EP | 0493704 | 4/1982 |
| DE | 372390 | 3/1923 | EP | 0056580 A1 | 7/1982 |
| DE | 386561 | 12/1923 | EP | 0120154 | 10/1984 |
| DE | 387973 | 1/1924 | EP | 0130124 | 1/1985 |
| DE | 406371 | 11/1924 | EP | 0142813 | 5/1985 |
| DE | 425551 | 2/1926 | EP | 0155405 | 9/1985 |
| DE | 426793 | 3/1926 | EP | 0 102 513 | 1/1986 |
| DE | 432169 | 7/1926 | EP | 0174783 | 3/1986 |
| DE | 433749 | 9/1926 | EP | 0 185 788 | 7/1986 |
| DE | 435608 | 10/1926 | EP | 0277358 | 8/1986 |
| DE | 435609 | 10/1926 | EP | 0234521 | 9/1987 |
| DE | 441717 | 3/1927 | EP | 0244069 | 11/1987 |
| DE | 443011 | 4/1927 | EP | 0246377 | 11/1987 |
| DE | 460124 | 5/1928 | EP | 0265868 | 5/1988 |
| DE | 482506 | 9/1929 | EP | 0274691 | 7/1988 |

| | | | | | | |
|---|---|---|---|---|---|---|
| EP | 0280759 | 9/1988 | | GB | 827600 | 2/1960 |
| EP | 0282876 | 9/1988 | | GB | 854728 | 11/1960 |
| EP | 0309096 | 3/1989 | | GB | 870583 | 6/1961 |
| EP | 0314860 | 5/1989 | | GB | 913386 | 12/1962 |
| EP | 0316911 | 5/1989 | | GB | 965741 | 8/1964 |
| EP | 0317248 | 5/1989 | | GB | 992249 | 5/1965 |
| EP | 0335430 | 10/1989 | | GB | 1024583 | 3/1966 |
| EP | 0342554 | 11/1989 | | GB | 1053337 | 12/1966 |
| EP | 0221404 | 5/1990 | | GB | 1059123 | 2/1967 |
| EP | 0375101 | 6/1990 | | GB | 1103098 | 2/1968 |
| EP | 0406437 | 1/1991 | | GB | 1103099 | 2/1968 |
| EP | 0439410 | 7/1991 | | GB | 1117401 | 6/1968 |
| EP | 0440865 | 8/1991 | | GB | 1135242 | 12/1968 |
| EP | 0469155 A1 | 2/1992 | | GB | 1147049 | 4/1969 |
| EP | 0490705 | 6/1992 | | GB | 1157885 | 7/1969 |
| EP | 0 503 817 | 9/1992 | | GB | 11746559 | 12/1969 |
| EP | 078908 | 5/1993 | | GB | 1236082 | 6/1971 |
| EP | 0571155 | 11/1993 | | GB | 1268770 | 3/1972 |
| EP | 0620570 | 10/1994 | | GB | 1319257 | 6/1973 |
| EP | 0 620 630 | 10/1994 | | GB | 1322433 | 7/1973 |
| EP | 0642027 | 3/1995 | | GB | 1340983 | 12/1973 |
| EP | 0671632 | 9/1995 | | GB | 1341050 | 12/1973 |
| EP | 0676777 | 10/1995 | | GB | 1365191 | 8/1974 |
| EP | 0677915 | 10/1995 | | GB | 1395152 | 5/1975 |
| EP | 0684679 | 11/1995 | | GB | 1424982 | 2/1976 |
| EP | 0684682 | 11/1995 | | GB | 1426594 | 3/1976 |
| EP | 0695019 | 1/1996 | | GB | 1438610 | 6/1976 |
| EP | 0732787 | 9/1996 | | GB | 1445284 | 8/1976 |
| EP | 0738034 | 10/1996 | | GB | 1479904 | 7/1977 |
| EP | 0739087 A2 | 10/1996 | | GB | 1493163 | 11/1977 |
| EP | 0740315 | 10/1996 | | GB | 1502938 | 3/1978 |
| EP | 0749190 A2 | 12/1996 | | GB | 1525745 | 9/1978 |
| EP | 0751605 | 1/1997 | | GB | 2000625 | 1/1979 |
| EP | 0739087 A3 | 3/1997 | | GB | 1548633 | 7/1979 |
| EP | 0749193 A3 | 3/1997 | | GB | 2046142 | 11/1979 |
| EP | 0780926 | 6/1997 | | GB | 2022327 | 12/1979 |
| EP | 0802542 | 10/1997 | | GB | 2025150 | 1/1980 |
| EP | 0913912 A1 | 5/1999 | | GB | 2034101 | 5/1980 |
| FR | 805544 | 4/1936 | | GB | 1574796 | 9/1980 |
| FR | 841351 | 1/1938 | | GB | 2070341 | 9/1981 |
| FR | 847899 | 12/1938 | | GB | 2070470 | 9/1981 |
| FR | 916959 | 12/1946 | | GB | 2071433 | 9/1981 |
| FR | 1011924 | 4/1949 | | GB | 2081523 | 2/1982 |
| FR | 1126975 | 3/1955 | | GB | 2099635 | 12/1982 |
| FR | 1238795 | 7/1959 | | GB | 2105925 | 3/1983 |
| FR | 2108171 | 5/1972 | | GB | 2106306 | 4/1983 |
| FR | 2251938 | 6/1975 | | GB | 2106721 | 4/1983 |
| FR | 2305879 | 10/1976 | | GB | 2136214 | 9/1984 |
| FR | 2376542 | * 7/1978 | ................. 310/258 | GB | 2140195 | 11/1984 |
| FR | 2467502 | 4/1981 | | GB | 2150153 | 6/1985 |
| FR | 2481531 | 10/1981 | | GB | 2268337 | 1/1994 |
| FR | 2556146 | 6/1985 | | GB | 2273819 | 6/1994 |
| FR | 2594271 | 8/1987 | | GB | 2283133 | 4/1995 |
| FR | 2708157 | 1/1995 | | GB | 2289992 | 12/1995 |
| GB | 123906 | 3/1919 | | GB | 2308490 | 6/1997 |
| GB | 268271 | 3/1927 | | GB | 2332557 | 6/1999 |
| GB | 293861 | 11/1928 | | HU | 175494 | 11/1981 |
| GB | 292999 | 4/1929 | | JP | 60206121 | 3/1959 |
| GB | 319313 | 7/1929 | | JP | 57043529 | 8/1980 |
| GB | 518993 | 3/1940 | | JP | 57126117 | 5/1982 |
| GB | 537609 | 6/1941 | | JP | 59076156 | 10/1982 |
| GB | 540456 | 10/1941 | | JP | 59159642 | 2/1983 |
| GB | 589071 | 6/1947 | | JP | 6264964 | 9/1985 |
| GB | 666883 | 2/1952 | | JP | 1129737 | 5/1989 |
| GB | 685416 | 1/1953 | | JP | 62320631 | 6/1989 |
| GB | 702892 | 1/1954 | | JP | 2017474 | 1/1990 |
| GB | 715226 | 9/1954 | | JP | 3245748 | 2/1990 |
| GB | 723457 | 2/1955 | | JP | 4179107 | 11/1990 |
| GB | 739962 | 11/1955 | | JP | 318253 | 1/1991 |
| GB | 763761 | 12/1956 | | JP | 424909 | 1/1992 |
| GB | 805721 | 12/1958 | | JP | 5290947 | 4/1992 |

| | | | | | | |
|---|---|---|---|---|---|---|
| JP | 6196343 | 12/1992 | | WO | WO9745927 | 12/1997 |
| JP | 6233442 | 2/1993 | | WO | WO9745928 | 12/1997 |
| JP | 6325629 | 5/1993 | | WO | WO9745929 | 12/1997 |
| JP | 7057951 | 8/1993 | | WO | WO9745930 | 12/1997 |
| JP | 7264789 | 3/1994 | | WO | WO9745931 | 12/1997 |
| JP | 8167332 | 12/1994 | | WO | WO9745932 | 12/1997 |
| JP | 7161270 | 6/1995 | | WO | WO9745933 | 12/1997 |
| JP | 8264039 | 11/1995 | | WO | WO9745934 | 12/1997 |
| JP | 9200989 | 1/1996 | | WO | WO9745935 | 12/1997 |
| JP | 8036952 | 2/1996 | | WO | WO9745936 | 12/1997 |
| JP | 8167360 | 6/1996 | | WO | WO9745937 | 12/1997 |
| LU | 67199 | 3/1972 | | WO | WO9745938 | 12/1997 |
| SE | 90308 | 9/1937 | | WO | WO9745939 | 12/1997 |
| SE | 305899 | 11/1968 | | WO | WO9747067 | 12/1997 |
| SE | 255156 | 2/1969 | | WO | WO9834315 | of 1998 |
| SE | 341428 | 12/1971 | | WO | WO9820595 | 5/1998 |
| SE | 453236 | 1/1982 | | WO | WO9820596 | 5/1998 |
| SE | 457792 | 6/1987 | | WO | WO9820597 | 5/1998 |
| SE | 502417 | 12/1993 | | WO | WO 98/20598 | 5/1998 |
| SU | 792302 | 1/1971 | | WO | WO9820600 | 5/1998 |
| SU | 425268 | 9/1974 | | WO | WO 98/20602 | 5/1998 |
| SU | 1019553 | 1/1980 | | WO | WO9821385 | 5/1998 |
| SU | 694939 | 1/1982 | | WO | PCT/FR 98/00468 | 6/1998 |
| SU | 955369 | 8/1983 | | WO | WO9827634 | 6/1998 |
| SU | 1511810 | 5/1987 | | WO | WO9827635 | 6/1998 |
| WO | WO8202617 | 8/1982 | | WO | WO9827636 | 6/1998 |
| WO | WO8502302 | 5/1985 | | WO | WO9829927 | 7/1998 |
| WO | WO9011389 | 10/1990 | | WO | WO9829928 | 7/1998 |
| WO | WO9012409 | 10/1990 | | WO | WO9829929 | 7/1998 |
| WO | PCT/DE 90/00279 | 11/1990 | | WO | WO9829930 | 7/1998 |
| WO | WO9101059 | 1/1991 | | WO | WO9829931 | 7/1998 |
| WO | WO9101585 | 2/1991 | | WO | WO9829932 | 7/1998 |
| WO | WO9107807 | 3/1991 | | WO | WO9833731 | 8/1998 |
| WO | PCT/SE 91/00077 | 4/1991 | | WO | WO9833736 | 8/1998 |
| WO | WO9109442 | 6/1991 | | WO | WO9833737 | 8/1998 |
| WO | WO 91/11841 | 8/1991 | | WO | WO9834238 | 8/1998 |
| WO | WO8115862 | 10/1991 | | WO | WO 98/34239 | 8/1998 |
| WO | WO 91/15755 | 10/1991 | | WO | WO9834240 | 8/1998 |
| WO | WO9201328 | 1/1992 | | WO | WO9834241 | 8/1998 |
| WO | WO9203870 | 3/1992 | | WO | WO9834242 | 8/1998 |
| WO | WO9321681 | 10/1993 | | WO | WO9834243 | 8/1998 |
| WO | WO9406194 | 3/1994 | | WO | WO9834244 | 8/1998 |
| WO | WO9518058 | 7/1995 | | WO | WO9834245 | 8/1998 |
| WO | WO9522153 | 8/1995 | | WO | WO9834246 | 8/1998 |
| WO | WO9524049 | 9/1995 | | WO | WO9834247 | 8/1998 |
| WO | WO9622606 | 7/1996 | | WO | WO9834248 | 8/1998 |
| WO | WO9622607 | 7/1996 | | WO | WO9834249 | 8/1998 |
| WO | PCT/CN 96/00010 | 10/1996 | | WO | WO9834250 | 8/1998 |
| WO | WO9630144 | 10/1996 | | WO | WO9834309 | 8/1998 |
| WO | WO9710640 | 3/1997 | | WO | WO9834312 | 8/1998 |
| WO | WO9711831 | 4/1997 | | WO | WO9834321 | 8/1998 |
| WO | WO9716881 | 5/1997 | | WO | WO9834322 | 8/1998 |
| WO | WO 97/29494 | 8/1997 | | WO | WO9834323 | 8/1998 |
| WO | WO9745288 | 12/1997 | | WO | WO9834325 | 8/1998 |
| WO | WO9745847 | 12/1997 | | WO | WO9834326 | 8/1998 |
| WO | WO9745848 | 12/1997 | | WO | WO9834327 | 8/1998 |
| WO | WO9745906 | 12/1997 | | WO | WO9834328 | 8/1998 |
| WO | WO9745907 | 12/1997 | | WO | WO9834329 | 8/1998 |
| WO | WO9745912 | 12/1997 | | WO | WO9834330 | 8/1998 |
| WO | WO9745914 | 12/1997 | | WO | WO9834331 | 8/1998 |
| WO | WO9745915 | 12/1997 | | WO | WO 98/40627 | 9/1998 |
| WO | WO9745916 | 12/1997 | | WO | WO 98/43336 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |
| WO | WO9745922 | 12/1997 | | WO | WO9917314 | 4/1999 |
| WO | WO9745923 | 12/1997 | | WO | WO9917315 | 4/1999 |
| WO | WO9745924 | 12/1997 | | WO | WO9917316 | 4/1999 |
| WO | WO9745925 | 12/1997 | | WO | WO9917422 | 4/1999 |
| WO | WO9745926 | 12/1997 | | WO | WO9917424 | 4/1999 |

| | | |
|---|---|---|
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Analysis of faulted Power Systems; P Anderson, Iowa State University Press / Ames, Iowa, 1973, pp. 255–257.

36–Kv. Generators Arise from Insulation Research; P. Sidler; *Electrical World* Oct. 15, 1932, pp. 524.

Oil Water cooled 300 MW turbine generator;L.P. Gnedin et al;*Elektrotechnika*, 1970, pp. 6–8.

J&P Transformer Book 11$^{th}$ Edition;A. C. Franklin et al; owned by Butterworth—Heinemann Ltd, Oxford Printed by Hartnols Ltd in Great Britain 1983, pp. 29–67.

Transformerboard; H.P. Moser et al; 1979, pp. 1–19.

The Skagerrak transmission—the world's longest HVDC submarine cable link; L. Haglof et al of ASEA; ASEA Journal vol. 53, No. 1–2, 1980, pp. 3–12.

Direct Connection of Generators to HVDC Converters: Main Characteristics and Comparative Advantages; J.Arrillaga et al; *Electra* No. 149, Aug. 1993, pp. 19–37.

Our flexible friend article; M. Judge; *New Scientist*, May 10, 1997, pp. 44–48.

In–Service Performance of HVDC Converter transformers and oil–cooled smoothing reactors; G.L. Desilets et al; *Electra* No. 155, Aug. 1994, pp. 7–29.

Transformateurs a courant continu haute tension–examen des specifications; A. Lindroth et al; *Electra* No. 141, Apr. 1992, pp. 34–39.

Development of a Termination for the 77 kV–Class High Tc Superconducting Power Cable; T. Shimonosono et al; IEEE Power Delivery, vol. 12, No. 1, Jan. 1997, pp. 33–38.

Verification of Limiter Performance in Modern Excitation Control Systems; G. K. Girgis et al; IEEE Energy Conservation, vol. 10, No. 3, Sep. 1995, pp. 538–542.

A High Initial response Brushless Excitation System; T. L. Dillman et al; IEEE Power Generation Winter Meeting Proceedings, Jan. 31, 1971, pp. 2089–2094.

Design, manufacturing and cold test of a superconducting coil and its cryostat for SMES applications; A. Bautista et al; IEEE Applied Superconductivity, vol. 7, No. 2, Jun. 1997, pp. 853–856.

Quench Protection and Stagnant Normal Zones in a Large Cryostable SMES; Y. Lvovsky et al; IEEE Applied Superconductivity, vol. 7, No. 2, Jun. 1997, pp. 857–860.

Design and Construction of the 4 Tesla Background Coil for the Navy SMES Cable Test Apparatus; D.W.Scherbath et al; IEEE Appliel Superconductivity, vol. 7, No. 2, Jun. 1997, pp. 840–843.

High Speed Synchronous Motors Adjustable Speed Drives; ASEA Generation Pamphlet OG 135–101 E, Jan. 1985, pp. 1–4.

Billig burk motar overtonen; A. Felldin; *ERA* (Teknik) Aug. 1994, pp. 26–28.

400–kv XLPE cable system passes CIGRE test; ABB Article; ABB Review Sep. 1995, pp 38.

Freqsyn—a new drive system for high power applications; J–A. Bergman et al; ASEA Journal 59, Apr. 1986, pp. 16–19.

Canadians Create Conductive Concrete; J. Beudoin et al; *Science*, vol. 276, May 23, 1997, p. 1201.

Fully Water–Cooled 190 MVA Generators in the Tonstad Hydroelectric Power Station; E. Ostby et al; BBC Review Aug. 1969, pp. 380–385.

Relocatable static var compensators help control unbundled power flows; R. C. Knight et al; *Transmission & Distribution*, Dec. 1996, pp. 49–54.

Investigation and Use of Asynchronized Machines in Power Systems*; N.I.Blotskii et al; *Elektrichestvo*, No. 12, 1–6, 1985, pp. 90–99.

Variable–speed switched reluctance motors; P.J. Lawrenson et al; IEE proc, vol. 127, Pt.B, No.4, Jul. 1980, pp. 253–265.

Das Einphasenwechseltromsystem hoherer Frequenz; J.G. Heft; Elektrische Bahnen eb; Dec. 1987, pp. 388–389.

Power Transmission by Direct Current;E. Uhlmann;ISBN 3–540–07122–9 Springer–Verlag, Berlin/Heidelberg/New York; 1975, pp. 327–328.

Elektriska Maskiner; F. Gustavson; Institute for Elkreafteknilk, KTH; Stockholm, 1996, pp. 3–6–3–12.

Die Wechselstromtechnik; A Cour' Springer Verlag, Germany; 1936, pp. 586–598.

Insulation systems for superconducting transmission cables; O. Toennesen; Nordic Insulation Symposium, Bergen, 1996, pp. 425–432.

MPTC: An economical alternative to universal power flow controllers;N. Mohan; EPE 1997, Trondheim, pp. 3.1027–3.1030.

Lexikon det Technik; Luger; Band 2, Grundlagen der Elektrotechnik und Kerntechnik, 1960, p. 395.

Das Handbuch der Lokomotiven ( hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp. 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp. 1–13.

Regulating transformers in power systems—new concepts and applications; E. Wirth et al; ABB Review Apr. 1997, pp. 12–20.

Transforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530 or 3–540–62070–2.

High Voltage Engineering; N.S. Naidu; High Voltage Engineering ,second edition 1995 ISBN 0–07–462286–2, Chapter 5, pp. 91–98.

Performance Characteristics of a Wide Range Induction Type Frequency Converter; G.A. Ghoneem; Ieema Journal, Sep. 1995, pp. 21–34.

International Electrotechnical Vocabulary, Chapter 551 Power Electronics;uknown author; International Electrotechnical Vocabulary Chapter 551: Power Electronics Bureau Central de la Commission Electrotechnique Internationale, Geneve; 1982, pp. 1–65.

Design and manufacture of a large superconducting homopolar motor; A.D. Appleton; IEEE Transactions on Magnetics, vol. 19, No. 3, Part 2, May 1983, pp. 1048–1050.

Application of high temperature superconductivity to electric motor design; J.S. Edmonds et al; IEEE Transactions on Energy Conversio Jun. 1992, No. 2, pp. 322–329.

Power Electronics and Variable Frequency Drives; B. Bimal; IEEE industrial Electronics—Technology and Applications, 1996, p. 356.

Properties of High Plymer Cement Mortar; M. Tamai et al; *Science & Technology in Japan*, No. 63; 1977, pp. 6–14.

Weatherability of Polymer–Modified Mortars after Ten–Year Outdoor Exposure in Koriyama and Sapporo; Y. Ohama et al; *Science & Technology in Japan No. 63*; 1977, pp. 26–31.

SMC Powders Open New Magnetic Applications; M. Pearson (Editor); *SMC Update*, vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, pp. 1882–1888.

Low–intensity laser–triggering of rail–gaps with magnesium–aerosol switching–gases; W. Frey; 11th International Pulse Power Conference, 1997, Baltimore, USA Digest of Technical Papers, pp. 322–327.

Shipboard Electrical Insulation; G. L. Moses, 1951, pp. 2 & 3.

ABB Elkrafthandbok; ABB AB; 1988 ; pp. 274–276.

Elkraft teknisk Handbook, 2 Elmaskiner; A. Alfredsson et al; 1988, pp. 121–123.

High Voltage Cables in a New Class of Generators Powerformer: M. Leijon et al; Jun. 14, 1999; pp. 1–8.

Ohne Transformator direkt ins Netz: Owman et al. ABB. AB: Feb. 8, 1999; pp. 48–51.

Submersible Motors and Wet–Rotor Motors for Centrifugal Pumps Submerged in the Fluid Handled: K.. Bienick, KSB; Feb. 25, 1988; pp. 9–17.

High Voltage Generators; G. Beschastnov et al; 1977; vol. 48, No. 6 pp. 1–7.

Eine neue Type von Unterwassermotoren: Electrotechnik und Maschinenbam, 49; Aug. 1931; pp. 2–3.

Problems in design of the 110–50okV high–voltage generators: Nikiti et al; World Electrotechnical Congress: 6/21–27/ 77; Section 1. Paper #18.

Manufacture and Testing of Roebel bars: P. Marti et al: 1960. Pub.86. vol. 8. pp. 25–31.

Hydroalternators of 110 to 220 kV Elektrotechn. Obz. vol. 64, No. 3, pp. 132–136 Mar. 1975: A. Abramov.

Design Concepts for an Amorphous Metal Distribution Transformer, E. Boyd et al; IEEE 11/84.

Neue Wege zum Bau zweipoliger Turbogeneratoren bis 2 GVA, 60kV Elektrotechnik und Maschinenbau Wien Janner 1972. Heft 1, Seite 1–11; G. Aichholzer.

Optimizing designs of water–resistant magnet wire; V. Kuzenev et al; Elektrotekhnika, vol. 59, No. 12, pp. 35–40, 1988.

Zur Entwicklung der Tauchpumpenmotoren; A. Schanz; KSB, pp. 19–24.

Direct Generation of alternating current at high voltages; R. Parsons; IEEE Journal, vol. 67 #393, Jan. 15, 1929; pp. 1065–1080.

Stopfbachslose Umwalzpumpen—ein wichtiges Element in modernen Kraftwerkbau; H. Holz, KSB 1, pp. 13–19, 1960.

Zur Geschichte der Brown Boven–Synchron–Maschinen; Vierzig Jahre Generatorau; Jan.–Feb. 1931 pp. 15–39.

Technik und Anwendung moderner Tauchpumpen; A. Heumann; 1987.

High capacity synchronous generator having no tooth stator; V.S. Kildishev et al; No. 1, 1977 pp. 11–16.

Der Asynchronmotor als Antrieb stopfbcichsloser Pumpen; E. Picmaus; Eletrotechnik und Maschinenbay No. 78, pp. 153–155, 1961.

Low core loss rotating flux transformer; R. F. Krause, et al; American Institute Physics J.Appl.Phys vol. 64 #10 Nov. 1988, pp. 5376–5378.

An EHV bulk Power transmission line Made with Low Loss XLPE Cable;Ichihara et al; 8/92; pp. 3–6.

Underground Transmission Systems Reference Book; 1992;pp. 16–19; pp. 36–45; pp. 67–81.

Power System Stability and Control; P. Kundur, 1994; pp. 23–25; p. 767.

Six phase Synchronous Machine with AC and DC Stator Connections, Part II:Harmonic Studies and a proposed Uninterruptible Power Supply Scheme; R. Schiferl et al.;Aug. 1993 pp. 2694–2701.

Six phase Synchronous Machine with AC and DC Stator Connections, Part 1: Equivalent circuit representation and Steady–State Analysis; R. Schiferl et al; Aug. 1983; pp. 2685–2693.

Reactive Power Compensation; T. Petersson; 1993; pp. 1–23.

Permanent Magnet Machines; K. Binns; 1987; pp. 9–1 through 9–26.

Hochspannungsaniagen for Wechselstrom; 97. Hochspannungsaufgaben an Generatoren und Motoren; Roth et al; 1938; pp. 452–455.

Hochspannungsanlagen for Wechselstrom; 97. Hochspannungsaufgaben an Generatoren und Motoren; Roth et al; Spring 1959. pp. 30–33.

Neue Lbsungswege zum Entwurf grosser Turbogeneratoren bis 2GVA, 60kV; G. Aicholzer; Sep. 1974, pp. 249–255.

Advanced Turbine–generators—an assessment; A. Appleton. et al; International Conf. Proceedings, Lg HV Elec. Sys. Paris. FR. Aug.–Sep. 1976, vol. 1, Section 11–02. pp. 1–9.

Fully slotless turbogenerators: E. Spooner; Proc., IEEE vol. 120 #12, Dec. 1973.

Toroidal winding geometry for high voltage superconducting alternators; J. Kirtley et al; MIT—Elec. Poewr Sys. Engrg. Lab for IEEE PES:Feb. 1974.

High–Voltage Stator Winding Development; D. Albright et al; Proj. Report EL339. Project 1716, Apr. 1984.

Powerformer ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp. 330–334.

Development of extruded polymer insulated superconducting cable; Jan. 1992.

Transformer core losses; B. Richardson; Proc. IEEE May 1986, pp. 365–368.

Cloth–transformer with divided windings and tension annealed amorphous wire; T. Yammamoto et al, IEEE Transaction Journal on Magnetics in Japan vol. 4, No. 9 Sep. 1989.

\* cited by examiner

LAMINATED MAGNETIC CORE FOR ELECTRIC MACHINES

TECHNICAL FIELD

The present invention relates to a laminated magnetic core for rotating electric machines and a rotating electric machine comprising such laminated magnetic core.

The machine is in the first place intended as a generator in a power station for generating electric power.

The invention is applicable to rotating electric machines such as synchronous machines and normal asynchronous machines. The invention is also applicable to other electric machines such as dual-fed machines and applications in synchronous static current converter cascades, outerpole machines and synchronous flow machines provided their windings are manufactured with insulating electric conductors, and preferably for high voltages. High voltages shall be understood here to mean electric voltages in excess of 10 kV.

BACKGROUND ART

Similar machines have conventionally been designed for voltages in the range 15–30 kV, and 30 kV has normally been considered to be an upper limit. This usually means that a generator must be connected to the power network via a transformer which steps up the voltage to the level of the power network—in the range of approximately 130–400 kV.

A machine which can operate at higher power levels and which can be directly connected to a power network is known from PCT/SE97/00874.

The laminations in laminated stator cores (laminated magnetic cores) for large electric machines are normally laid one by one with overlap in such a way that grooves in the laminations match facing surfaces in the dovetail-shaped wedge of the stator frame. (See FIG. 2.) To enable the lamination to assume its position it is bent sufficiently for the dovetail-shaped groove part to pass the surface of the dovetail-shaped wedge. This method of manufacture is relatively complicated, time-consuming and thus expensive.

SUMMARY OF THE INVENTION

The object of the present invention is to solve the problems mentioned above. This is achieved with a laminated magnetic core for rotating electric machines as defined in claim 1, and a rotating electric machine comprising a laminated magnetic core of the type described above as defined in claim 10. The laminated magnetic core according to the present invention comprises a number of stack members, each consisting of a number of sheets of metal joined together. Each stack member is provided with two identical grooves arranged to cooperate with wedge members designed to join the stack members together. Each wedge member has two protrusions arranged symmetrically in relation to the longitudinal axis of the wedge member. Each groove in the stack member has at least one part shaped to fit said protrusion. The stack members in the laminated magnetic core are stacked on and partially overlapping each other to form different layers of stack members, the grooves in the stack members in the various layers being arranged substantially opposite each other. The wedge members are arranged in the grooves with a protrusion abutting the complementary shape of the groove in such a manner that the stack members in one layer are secured counter-clockwise in tangential direction and that the stack members in at least one of the adjacent layers are secured clockwise in tangential direction. The laminated magnetic core also includes locking members arranged at least at the transition between layers secured clockwise and layers secured counter-clockwise in order to prevent tangential movement between the different layers.

The above-mentioned laminated magnetic core according to the present invention is easy and quick to manufacture. It is thus also relatively inexpensive to manufacture.

BRIEF DESCRIPTION OF THE DRAWINGS

The invention will be explained in more detail in the following description of preferred embodiments thereof, with reference to the accompanying drawings in which.

Figure 1:
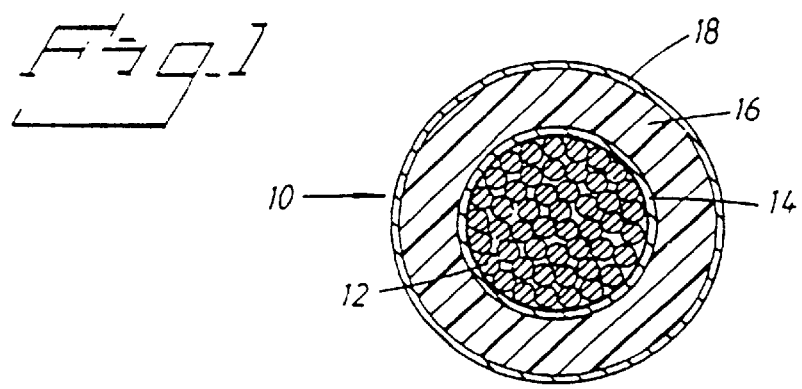
FIG. 1 shows a cross-sectional view of a high-voltage cable.

DETAILED DESCRIPTION OF EMBODIMENTS OF THE INVENTION:

FIG. 1 shows a cross-sectional view of a high-voltage cable 10 which is traditionally used for conducting electric power. The high-voltage cable 10 may be a standard PEX-cable 145 kV but without sheath or screen. The high-voltage cable 10 comprises an electric conductor that may consist of one or more strand parts 12 made of copper (Cu), for instance, and having circular cross section. These strand parts 12 are arranged in the middle of the high-voltage cable 10. Around the strand parts 12 is a first semiconducting layer 14, Around the first semiconducting layer 14 is a first insulating layer 16, e.g. PEX insulation. Around the first insulating layer 16 is a second semiconducting layer 18.

Figure 2:
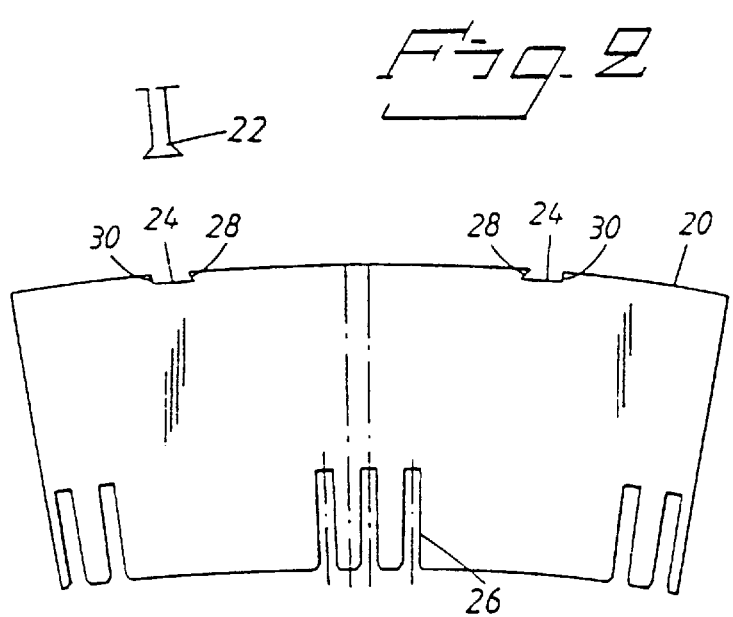
FIG. 2 shows a side view of a sheet of metal and a part of a wedge member according to the state of the art, which is included in a laminated magnetic core according to the state of the art.

FIG. 2 shows a side view of a sheet of metal 20 and a part of a wedge member 22 according to the state of the art included in a laminated magnetic core according to the state of the art. Each sheet of metal 20 is normally 0.35–0.50 mm thick and is provided with two grooves 24 arranged along the outer long side of the sheet 20. As can be seen in FIG. 2, the inner and outer long sides of the sheet 20 have different radii or curvature so that when the sheets 20 are fitted together to form a laminated magnetic core it will be cylindrical. The sheets 20 are also provided with a number of slots 26 arranged along the inner long side. These slots 26 are intended for stator windings in the assembled laminated magnetic core. The wedge members 22 (only a part of one wedge member 22 is shown) are arranged on the stator frame (not shown) and have a dovetail-shaped cross section at the end shown. The grooves 24 arranged along the outer long side of the metal sheet 20 have an inclined flank 28 and a straight, perpendicular flank 30. As can be seen in FIG. 2 both the inclined flanks 28 of the grooves 24 in each metal sheet 20 face each other. When the metal sheets 20 are to be assembled to form a laminated magnetic core, they are applied one by one and partially overlapping each other (see FIG. 3). The wedge members 22 are permanently arranged on the stator frame and have a length in a direction perpendicular to the drawing that is equal to the length of the laminated magnetic core. To enable a metal sheet 20 to assumes its proper position the metal sheet 20 must be bent so far that the inclined flanks 28 of the grooves 24 can pass the dovetail-shaped surfaces of the member 22. This means that the inclined flanges 28 of the metal sheet 20 match facing surfaces of the dovetail-shaped wedge member 22.

Figure 3:
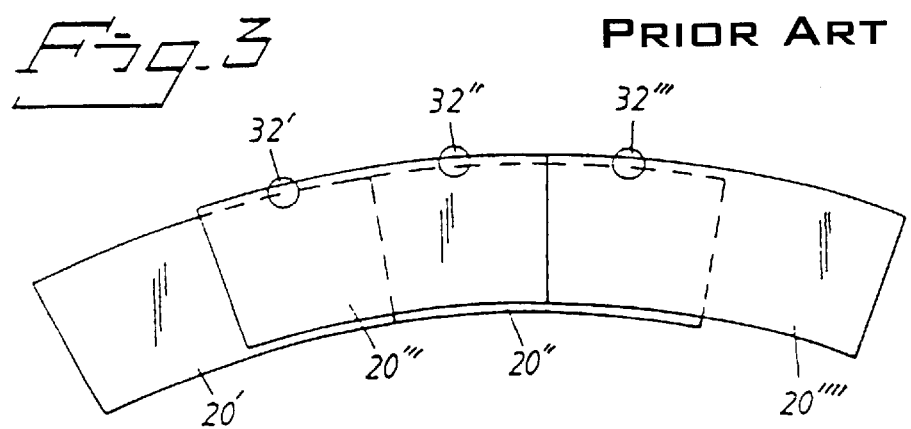
FIG. 3 shows a basic diagram explaining how the various sheets of metal are joined in relation to each other in a laminated magnetic core according to the state of the art.

FIG. 3 shows a basic diagram explaining how the different metal sheets are joined in relation to each other in a laminated magnetic core according to the state of the art. The sheets and wedges used may be as shown in FIG. 2, for instance. FIG. 3 shows four laminations 20', 20", 20'", 20"" where the sheets 20' and 20" are arranged in the lower layer and the sheets 20'" and 20"" are arranged in the upper layer. As can be seen in FIG. 3, the sheets 20' and 20'" are arranged partially overlapping so that one and the same wedge member (not shown, but intimated at 32') is arranged in the right groove of the sheet 20' and in the left groove of the sheet 20'". In corresponding manner the sheets 20" and 20'" are assembled partially overlapping so that one and the same wedge member (not shown, but intimated at 32") is arranged in the right groove of the sheet 20'" and in the left groove of the sheet 20'. The laminations are thus assembled one by one in order to produce a laminated magnetic core according to the state of the art. As pointed out in connection with FIG. 2, each lamination must be bent sufficiently to allow assembly.

Figure 4:
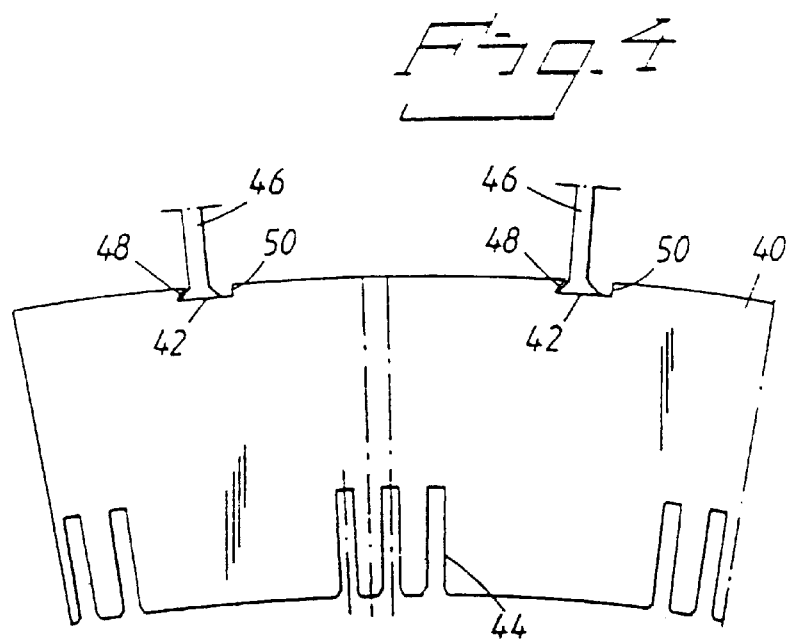
FIG. 4 shows a side view of a stack member and a part of wedge members included in a laminated magnetic core according to a first embodiment of the present invention.
Figure 5:
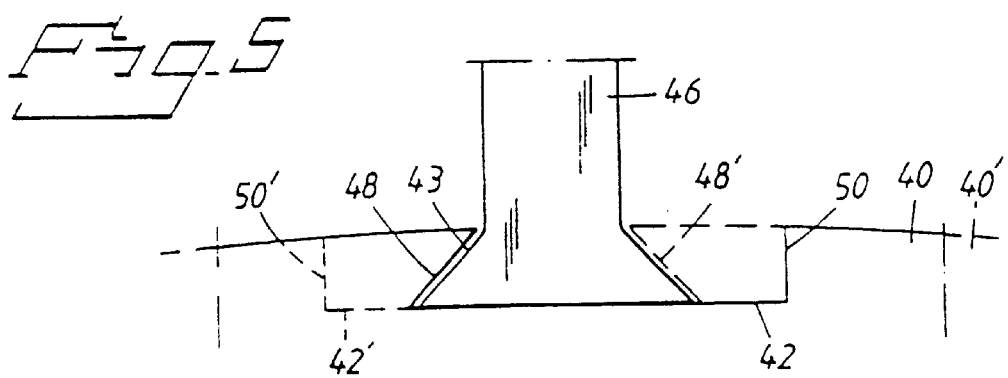
FIG. 5 shows a side view on an enlarged scale of how stack members in different layers are joined together by means of the wedge member in a laminated magnetic core according to the first embodiment of the present invention.

FIG. 4 shows a side view of a stack member and a part of wedge members in a laminated magnetic core according to a first embodiment of the present invention. Each stack member 40 comprises a number of metal sheets joined together. The metal sheets may have a thickness of 0.35–0.50 mm, for instance. Each stack member 40 comprises 50–100 sheets, for instance, which have been glued together. Each stack member 40 comprises two identical grooves 42 arranged along the outer long side of the stack member 40. As can be seen in FIG. 4, the inner and outer long sides of the stack member 40 have different radii of curvature so that when the stack members 40 are assembled to a laminated magnetic core it will be cylindrical. The stack members 40 are also provided with a number of slots 44 arranged along the inner long side of the stack member 40. These slots 44 are intended for the stator windings in the assembled laminated magnetic core. The laminated magnetic core also comprises wedge members 46 (shown only partially) which are arranged on the stator frame (not shown) and have a dovetailshaped cross section at the end shown (see also FIG. 5). The grooves 42 arranged along the outer long side of the stack member 40 have an inclined flank 48 and a straight, perpendicular flank 50. As can be seen in FIG. 4, both the inclined flanks 48 face the same way, i.e. they do not face each other as is the case with the lamination shown in FIG. 2. Furthermore, the entrance of the groove 42 is wider than the greatest width of the wedge member 46. This is shown even more clearly in FIG. 5. The main reason for the grooves 42 being shaped like this is that the stack members, comprising 50–100 laminations glued together, cannot be bent as is the case with individual laminations according to FIG. 2. When assembling a laminated magnetic core a stack member 40 is positioned by the two wedge members 46 being inserted into the grooves 42, after which the stack member 40 is displaced to the right in this case so that the inclined flanks 48 abut the dovetail shape of the wedge member. This stack member 40 is thus secured against clockwise movement in tangential direction. The next, partially overlapping stack member 40' (see FIGS. 5 and 6) to be assembled is first mirror-inverted so that the inclined flanges 48' of the grooves 42' are on the right instead of the left side of the grooves 42, 42'. Thereafter the mirror-inverted stack member is positioned by inserting the two wedge members 46 into the grooves 42', after which the stack member is displaced to the left in this case so that the inclined flanks 48' abut the dovetail shape of the wedge members 46. This stack member 40' is thus secured against counter-clockwise movement in tangential direction. The arrangement of a locking member at the transition between the stack members 40 and 40' in this position, causes these stack members 40 and 40' to be secured against tangential movement in both directions. This locking member may consist of a spot weld. (See FIG. 6.)

Figure 6:
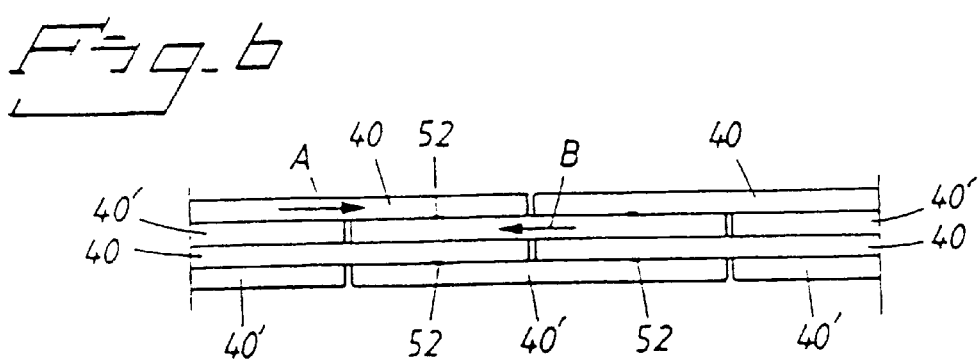
FIG. 6 shows a side view of a laminated magnetic core according to the present invention.

FIG. 6 shows a side view of a laminated magnetic core in accordance with the invention. As can be seen in FIG. 6 the stack members are arranged in different layers and partially overlapping like bricks in a wall, for instance. The stack members in alternative layers are indicated by reference designations 40 and the stack members in the other layers are indicated by reference designations 40'. This means that the stack members 40' are mirror-inverted in relation to the stack members 40. It also means that all stack members 40 are secured against counter-clockwise movement in tangential direction thanks to being locked against the wedge members. This is indicated by the arrow A in FIG. 6. The stack members 40', on the other hand, are secured against clockwise movement in tangential direction, thanks to their being locked against the wedge members. This is indicated by the arrow B in FIG. 6. If now locking members 52 in the form of spot welds 52 are arranged at at least alternate transitions between stack members 40 secured against counter-clockwise movement in tangential direction and stack members 40' secured against clockwise movement in tangential direction, tangential movement is prevented between the different layers. One variant is to arrange a linear weld instead of these spot welds 52.

The grooves in the stack members intended for the wedge member need not have the cross section illustrated. The grooves may also have dovetail shape and still provide a similar function to that described in connection with FIGS. 4–6. If dovetail-shaped grooves are used the stack members in alternate layers need not be mirror-inverted. On the other hand, different stack members must be made for each layer. This is because, when the laminated magnetic core is assembled the slots 44 for the stator windings must coincide. The slots 44 cannot therefore be arranged in the same way for stack members intended for different layers.

Figure 7:
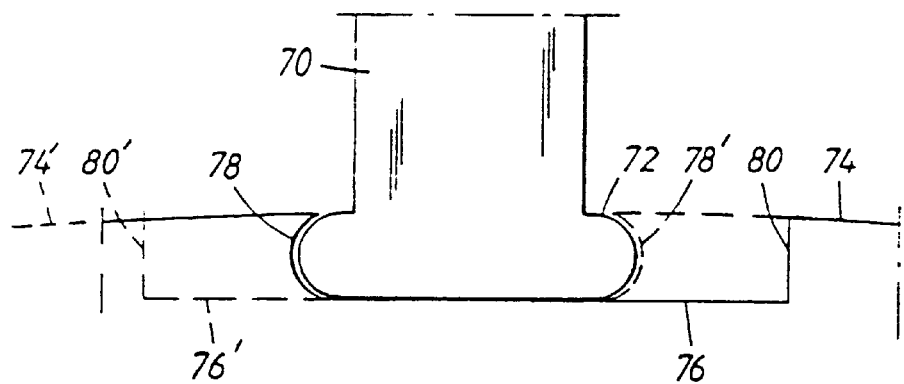
FIG. 7 shows a side view on an enlarged scale of how stack members in different layers are joined together by means of the wedge member in a laminated magnetic core according to a second embodiment of the present invention.

FIG. 7 shows a side view on an enlarged scale of how stack members in different layers are joined together by means of the wedge member in a laminated magnetic core according to a second embodiment of the present invention. As can be seen in FIG. 7 the wedge member 70 does not have a dovetail-shaped cross section, but two protrusions 72 arranged symmetrically in relation to the longitudinal axis of the wedge member 70. In this example the cross section of the protrusion 72 is in the shape of a semi-circle. FIG. 7 also shows part of a stack member 74 located in one layer and a stack member 74' located in an adjacent layer. Each stack member 74, 74' is provided with two grooves 76, 76' (only one groove is shown in the Figure) in a corresponding manner to the embodiment shown in FIGS. 4–5. The grooves 76, 76' have a part in the form of a recess 78, 78' with a form that fits the protrusion 72 on the wedge member 70. In this example the cross-sectional shape of the recess 78, 78' is a semi-circle. The grooves 76, 76' are then defined by a straight, perpendicular flank 80, 80. As can be seen in FIG. 7 the entrance to the grooves 76, 76' is larger than the greatest width of the cross section of the wedge member 70. The recess 78 of the groove 76 in the stack member 74 abuts the left-hand protrusion 72 of the wedge member 70 and secures the stack member 74 against clockwise movement in tangential direction. The recess 78' of the groove 76' in the stack member 74' abuts the right-hand protrusion 72 of the wedge member 70 and secures the stack member 74' against counter-clockwise movement in tangential direction. By applying a spot weld (not shown) in a manner corresponding to that described with reference to FIG. 6, the stack members 74, 74' are secured against tangential movement in both directions.

The cross sections of the recess of the wedge member and of the grooves intended for the wedge member need not be limited to the embodiments shown. The protrusion on the wedge member may be rectangular, for instance. The important thing is that the groove has at least one part with complementary shape to said protrusion so that locking occurs in a tangential direction when the groove is in contact with the protrusion on the wedge member.

Figure 8:
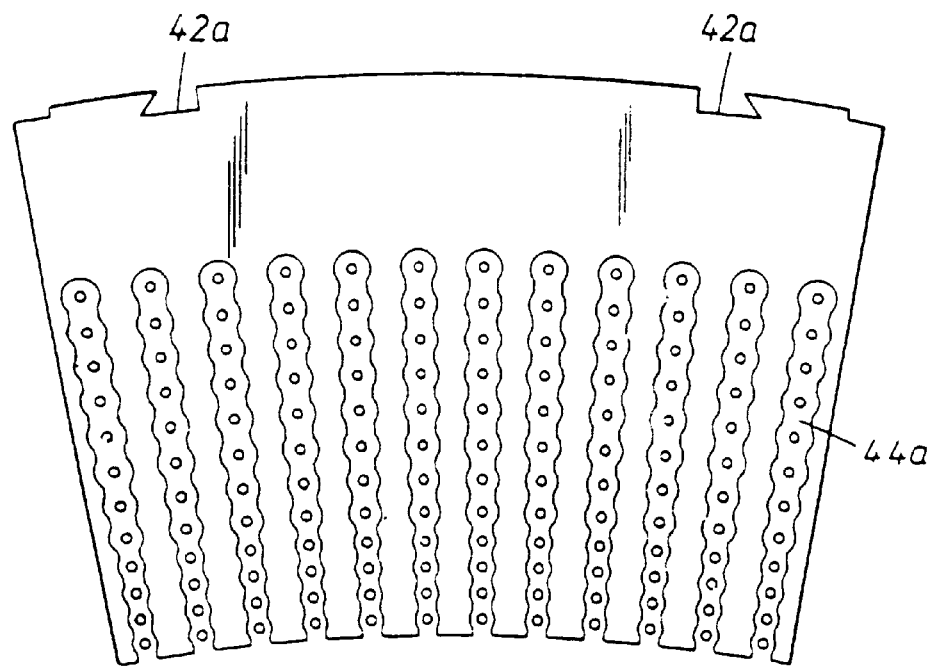
FIG. 8 shows a side view of a stack member according to an alternative embodiment of the invention.

FIG. 8 shows an alternative embodiment of the invention used for stack members where the slots 44b for the cable windings have a profile similar to a bicycle chain so that each cable part (in the Figure symbolised by a small circle) is situated in a wider part of the slot, and these parts are separated by narrower waist parts.

The invention is not limited to the embodiments shown. Several modifications are feasible within the scope of the invention.

What is claimed is:

1. A laminated magnetic core for rotating electric machines, wherein said laminated magnetic core comprises:
    a number of stack members each including a number of sheets of metal joined together, each stack member having a pair of identical grooves of selected cross-sectional area;
    wedge members of selected cross-sectional area including a maximum width dimension arranged to cooperate with the grooves to join said stack members together, wherein the cross-sectional area of the groove is larger than the cross-sectional area of the wedge member, and the grooves each have an entrance larger than the maximum width dimension of the cross section of the wedge member, the wedge member including a pair of two protrusions arranged symmetrically in relation to a longitudinal axis of the wedge member, said groove having at least one portion shaped to fit said protrusion, the stack members in the laminated magnetic core being stacked on and partially overlapping each other to form different layers of stack members, the grooves in the stack members in the various layers being arranged substantially opposite each other with the wedge members arranged in the grooves with a protrusion abutting the complementary shape of the groove in such a manner that the stack members in one layer are secured counter-clockwise in tangential direction and that the stack members in at least one of the adjacent layers are secured clockwise in tangential direction, and the laminated magnetic core includes locking members arranged at least at a transition between layers secured clockwise and layers secured counter-clockwise in order to prevent tangential movement between the different layers.

2. A laminated magnetic core as claimed in claim 1, wherein at least one part of each groove has a shape complementary to the protrusion of the wedge member located on the same side of the grooves in each stack member.

3. A laminated magnetic core as claimed in claim 2, wherein the wedge member has dovetail-shaped cross section.

4. A laminated magnetic core as claimed in claim 3, wherein the cross section of the groove has a trapezoidal shape in which one part has a shape complementary to said dovetail shape and one part has a rectangular shape.

5. A laminated magnetic core as claimed in claim 1, wherein the stack members in the various layers are arranged in such a manner that the stack members in one layer are mirror-inverted in relation to the stack members in at least one of the adjacent layers.

6. A laminated magnetic core as claimed in claim 5, wherein each groove has dovetail-shaped cross section.

7. A laminated magnetic core as claimed in claim 1, wherein said locking device comprises spot welds being arranged so that each stack member is joined by spot welds to layer adjacent thereto.

8. A laminated magnetic core as claimed in claim 1, wherein said locking means comprises a linear weld that joins adjacent layers of stack members with each other.

9. A laminated magnetic core as claimed in claim 1, wherein each stack member comprises an equal number of metal sheets.

10. A laminated magnetic core as claimed in claim 9, wherein the number of sheets is between 50 and 100 sheets.

11. A laminated magnetic core as claimed in claim 1, wherein the machine includes a winding in the form of a high voltage field confining cable.

12. A laminated magnetic core as claimed in claim 11, wherein the cable comprises a conductive member, a first layer having semiconducting properties in contact with and surrounding the conductive member; a solid insulating layer in contact with and surrounding the first layer; and a second layer having semiconducting properties in contact with and surrounding the insulating layer.

* * * * *